United States Patent
Tancevski

(10) Patent No.: US 6,728,212 B1
(45) Date of Patent: Apr. 27, 2004

(54) ASYMMETRIC VOID FILLING SCHEDULER WITH BANDWIDTH GRABBING

(75) Inventor: Ljubisa Tancevski, Dallas, TX (US)

(73) Assignee: Alcatel, Paris (FR)

( * ) Notice: Subject to any disclaimer, the term of this patent is extended or adjusted under 35 U.S.C. 154(b) by 535 days.

(21) Appl. No.: 09/602,836

(22) Filed: Jun. 23, 2000

(51) Int. Cl.[7] .......................... H04L 12/28; H04J 14/00; H04B 10/02

(52) U.S. Cl. .................... 370/235; 370/395.4; 370/468; 359/140; 398/49; 398/177

(58) Field of Search ................................ 370/231, 232, 370/235, 395.21, 395.4, 395.41, 412, 468; 359/117, 123, 124, 139, 140, 128; 398/48, 49, 95, 177; 385/132, 15, 16, 24

(56) References Cited

U.S. PATENT DOCUMENTS

| | | | |
|---|---|---|---|
| 5,416,769 A | | 5/1995 | Karol |
| 5,469,284 A | | 11/1995 | Haas |
| 5,486,943 A | | 1/1996 | Sasayama et al. |
| 5,734,486 A | * | 3/1998 | Guillemot et al. .......... 359/139 |
| 5,737,106 A | | 4/1998 | Sansonetti et al. |
| 6,069,894 A | * | 5/2000 | Holender et al. ........... 370/397 |
| 6,169,728 B1 | | 1/2001 | Perreault et al. |
| 2002/0054732 A1 | * | 5/2002 | Zheng .......................... 385/24 |

FOREIGN PATENT DOCUMENTS

| | | | |
|---|---|---|---|
| EP | 1030534 | * | 8/2000 |
| EP | 1 030 534 A2 | | 8/2000 |
| EP | 1 089 498 A2 | | 4/2001 |
| WO | WO 00/32008 | * | 11/1999 |
| WO | WO 00/32008 | | 6/2000 |

OTHER PUBLICATIONS

"A High–Speed Packet Switch Architecture With a Multichannel Bandwidth Allocation"; Kazuhiro Ohtsuki, et al.
"An Output–Buffered ATM Switch in the Multichannel Bandwidth Allocation Environment;" Wen De Zhong, et al., Electronics Communications in Japan, Part 1, vol. 74, No. 6, Jun. 1991; pp. 13–23.

"Multichannel Bandwidth Allocation in a Broadband Packet Switch"; Achille Pattavina; 8272 I.E.E.E. Journal on Selected Areas in Communications, vol. 6, No. 9, New York, NY; pp. 1489–1499.

"A New Scheduling Algorithm for Asynchronous, Variable Length IP Traffic Incorporating Void Filling"; Ljubisa Tancevski, et al.

"WDM Burst Switching for Petabit Data Networks;" Jonathan S. Turner; pp. WD2–1/47–WD2–3/49.

"WDM Burst Switching for Petabit Capacity Routers", Yuhua Chen, et al.; 1999 IEEE; pp. 968–973.

"WDM Burst Switching"; Jonathan S. Turner; Proceedings of INET 99.

"ECOC 2000"; 26th European Conference on Optical Communication; Proceedings vol. 2.

* cited by examiner

*Primary Examiner*—Afsar Qureshi
(74) *Attorney, Agent, or Firm*—Jessica W. Smith; V. Lawrence Sewell

(57) ABSTRACT

The invention is an apparatus and method for scheduling the flow of packets. Its purpose is to reduce excess loads, while at the same time, improving efficiency of the system. The scheduler is divided into two or more schedulers operating in parallel. Furthermore, each scheduler is assigned a subset of the available wavelengths. The assignment of wavelengths is done in an asymmetric manner such that one scheduler is assigned many more wavelengths. In addition, the void filling scheduler is used in conjunction with bandwidth grabbing to improve scheduling performance. In a preferred embodiment, the buffer occupancy of a first scheduler is monitored. If it is below a threshold (and a second scheduler's buffer is full), then packets intended for the second scheduler are transferred to the first scheduler.

17 Claims, 5 Drawing Sheets

ASYMMETRIC VOID FILLING SCHEDULER WITH BANDWIDTH GRABBING

FIELD OF INVENTION

This invention is related to the field of apparatuses and methods for scheduling the flow of packets. More particularly, it relates to the use of a scheduler for filling voids.

BACKGROUND OF INVENTION

Presently, void filling schedulers utilize only one scheduler operating over the entire set of available wavelengths. (A void is a gap or idle period/pattern of determined time length, appearing at the distribution of packets at the output fields of a switch/router. It essentially represents an absence of packets at the output). Assignment of wavelengths is done in the following manner. Assume that there are N wavelengths available on a certain link. Next, assume that the traffic load per wavelength and traffic overall is $\rho$. In addition, assume that there is one scheduler. The scheduler will schedule use of the packets over all N wavelengths, in effect performing interleaving over all the possible wavelengths. This is depicted in FIG. 1a where it is visible that the scheduler operates over all the wavelengths.

Another example of a void filling scheduler is disclosed in U.S. patent application Ser. No. 09/253,309, Optical Fiber-Delay Line Buffers With Void Filling, filed Feb. 19, 1999 and hereby incorporated by reference. It discloses the use of fiber-delay line buffers that incorporate a void filling procedure.

However, to substantially reduce excess load and increase efficiency using present void filling schedulers, large electronic memories are needed to store large numbers of existing voids ready to be filled. Hence, increased efficiency can only be obtained at the expense of a large increase in the complexity of the void filling scheduling method. In addition, inspecting large number of voids to find out whether a packet can be scheduled in an existing void is very time consuming. Hence, increasing the efficiency entails slowing the speed of the scheduler. Therefore, there is a trade off between complexity and efficiency when using only one scheduler.

SUMMARY OF THE INVENTION

The present invention is a method and apparatus for scheduling packets, comprising a plurality of schedulers connected in parallel and a packet divider/classifier circuit operably connected to the plurality of schedulers.

In another embodiment, the invention is an apparatus for scheduling packets, comprising a packet divider/classifier circuit, a plurality of input fibers operably connected to an input of the packet divider/classifier; and a plurality of schedulers connected in parallel. The plurality of schedulers are operably connected to an output of the packet divider/classifier circuit. Furthermore, at least one of the plurality of schedulers comprises at least one buffer. In addition, buffer monitor circuitry is operably connected to the plurality of schedulers. In a preferred embodiment, the buffers are fiber-delay line buffers.

In still another embodiment, the invention comprises a method of asymmetrically allocating bandwidth, comprising the steps of dividing a bandwidth into available wavelengths and assigning the available wavelengths to a plurality of schedulers, wherein at least one of the plurality of schedulers is assigned a different number of wavelengths than another of the plurality of schedulers.

In yet still another embodiment, the invention comprises a method and apparatus of bandwidth grabbing or dynamic bandwidth allocation in which buffer occupancy of at least one of a plurality of schedulers is monitored and at least one packet is redirected to a scheduler having a buffer occupancy below a threshold.

DETAILED DESCRIPTION OF THE INVENTION

The present invention is an apparatus and method for scheduling packet flow. Its purpose is to reduce excess loads, while at the same time improving efficiency of the system. In a preferred embodiment it uses fiber delay line optical buffers. In another preferred embodiment, it can be used to schedule asynchronous, variable length traffic. In addition, it can be used under any traffic condition in connection with non-degenerate buffers.

In a preferred embodiment, the invention is divided into two or more schedulers operating in parallel. Furthermore, each scheduler is assigned a subset of the available wavelengths. The assignment of wavelengths is done in an asymmetric manner such that one scheduler is assigned many more wavelengths. As a result, it experiences a much smaller load (and associated excess load) than the other schedulers. In another preferred embodiment, asymmetric assignment of wavelengths is used in conjunction with bandwidth grabbing to improve scheduling performance.

Figure 1A:
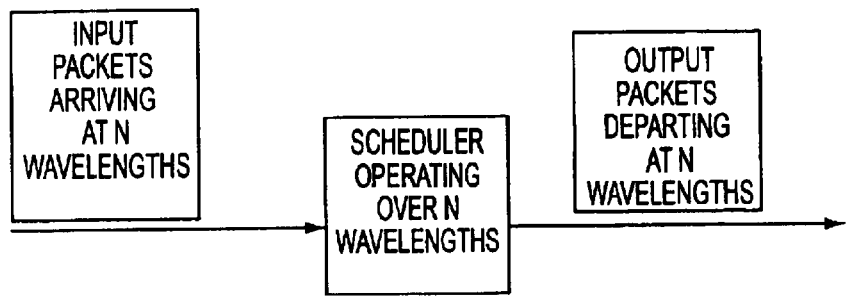
FIG. 1a as shows an example of one scheduler operating over N wavelengths.
Figure 1B:
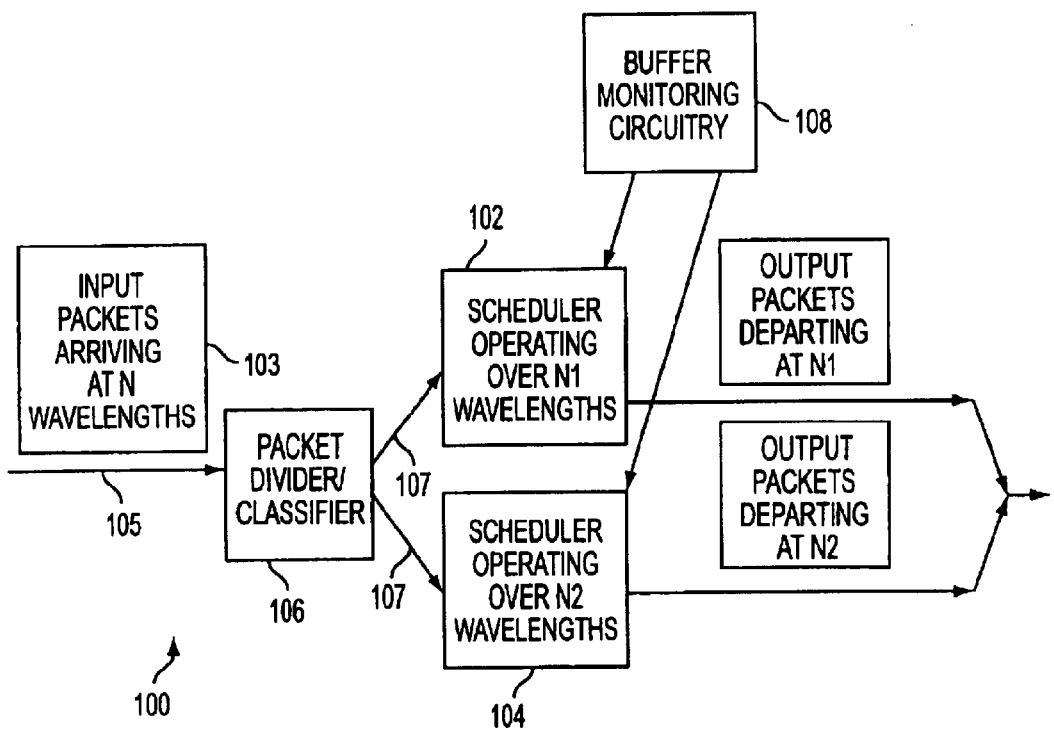
FIG. 1b shows an example of two schedulers operating over N wavelengths.

For example, assume that there are two schedulers 102 and 104 operating in parallel. Each scheduler is assigned a subset of the N available wavelengths. This is depicted in FIG. 1b. In a preferred embodiment, N1 wavelengths are assigned to the first scheduler 102 and N2 wavelengths are assigned to the second scheduler 104 such that N1+N2=N and N1≠N2. Both schedulers operate in parallel and independently.

Furthermore, a packet divider/classifier circuit 106 is used to route incoming packets to the appropriate scheduler. A plurality of input fibers 103 are operably connected to the input 105 of the packet divider/classifier 106 and a plurality of schedulers operably connected to the output 107 of the packet divider/classifier circuit 106. One routing approach comprises assigning packets between the two schedulers in the same percentage as the wavelengths that were assigned.

For example, assume that there are 30 available wavelengths. If the first scheduler 102 is assigned or operates over 20 wavelengths and the second scheduler 104 is assigned 10 wavelengths (that is, 1:2 ratio), then the packet divider 106 directs 66% of the packets to the first scheduler 102 and 33% to the second scheduler 104. Consequently, both schedulers will see same traffic load as seen by the incoming link. However, the overall system performance will be poor because the schedulers will operate over smaller subsets of wavelengths and the statistical multiplexing gain stemming from multiplexing over a number of wavelengths will be reduced. In a preferred embodiment, the packet divider/ classifier 106 divides incoming traffic 50/50 between the two schedulers 102 and 104. Furthermore, it assigns wavelengths asymmetrically by assigning 25 wavelengths to the first scheduler 102 and assigns 5 wavelengths to the second scheduler 104. This creates a huge imbalance in the load experienced by each scheduler because the first scheduler 102 is going to see a light load and the second scheduler 104 a heavy load. This will produce a low probability of packet loss in the first scheduler 102 and a higher probability of packet loss in the second scheduler 104.

One way to reduce the probability of packet loss is to dynamically allocate bandwidth between the schedulers. Normally, packets destined for the first scheduler 102 will go there. Furthermore, packets directed toward the second scheduler 104 will go to the second scheduler 104. However, if the buffer occupancy of the second scheduler 104 is full and there is a threat of buffer overflow, then packets may be redirected from the second scheduler 104 to the first scheduler 102.

This may occur if the occupancy of the first scheduler 102 is below a threshold T1. If it is below threshold T1 (and the buffer occupancy of the second scheduler 104 is full), then packets intended for the second scheduler 104 are transferred to the first scheduler 102. This is an example of one way bandwidth grabbing or dynamic bandwidth allocation. (In a preferred embodiment, a threshold of 0.5 of the maximum buffer occupancy is used. However, this threshold can be either higher or lower depending on the particular application. In another preferred embodiment, the threshold can fall within a range of approximately 0.1 to 1).

Figure 2:
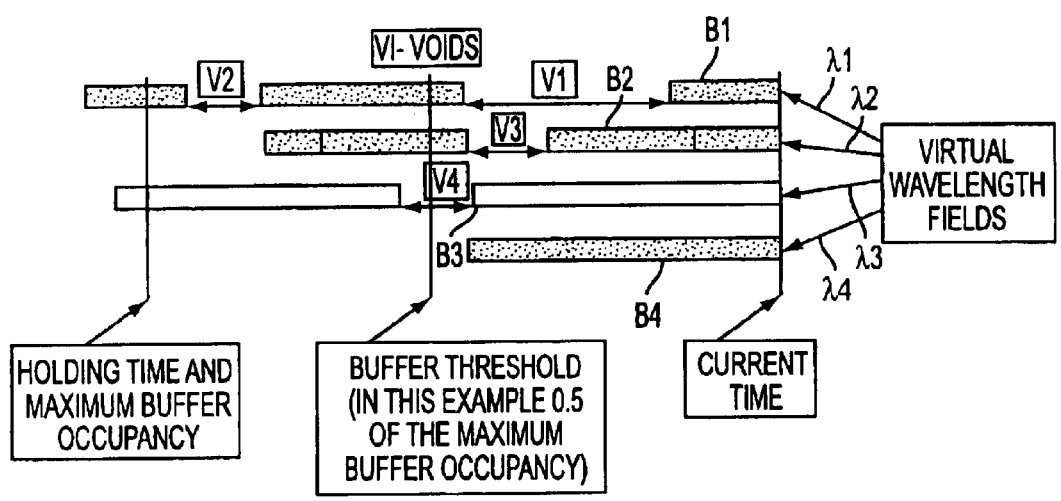
FIG. 2 is a flow diagram, which illustrates the use of virtual wavelength fields and a buffer threshold mechanism.

An example of a buffer monitoring or management scheme using optical fiber-delay line buffers is shown in FIG. 2. In a preferred embodiment, it uses wavelength division multiplexing (WDM). It creates virtual wavelength fields for each wavelength available on the output link. These wavelength fields govern the distribution of the packets at the output wavelengths.

In addition, buffer occupancy is monitored by buffer monitoring circuitry 108 (or a buffer threshold mechanism) which monitors the occupancy of every virtual wavelength field (see FIG. 1b). The maximum occupancy is given by the maximum holding time of the fiber delay line buffer, i.e., the maximum length of the fiber delay line in the buffer. Setting a bandwidth threshold T1 of 0.5 means that there is at least one virtual wavelength field whose occupancy is less than 0.5 of the maximum holding time:

When using a bandwidth threshold T1 of 0.5, bandwidth grabbing (or dynamic bandwidth allocation) occurs when a packet originally intended for the second scheduler 104 is redirected to a wavelength field whose occupancy is less than 0.5 in the first scheduler 102. In case there is more than one wavelength field whose occupancy is less than the threshold (e.g. 0.5), then the packet is directed to the wavelength field with minimum occupancy.

FIG. 2 depicts an embodiment in which a first scheduler 102 is operated over a plurality lo of available wavelengths, $\lambda 1$ to $\lambda 4$, each with a buffer occupancy B1 through B4 respectively. (In a preferred embodiment, there are 4 available wavelengths. However, the number of wavelengths can be either higher or lower depending on the particular application). The buffer threshold T1 is depicted as being 0.5 of the maximum buffer occupancy, that is 0.5 of the maximum length of the available delay line. In this example, only wavelength field $\lambda 4$ has a buffer occupancy B4 below the threshold T1.

Consequently, if the second scheduler 104 is 100% occupied, the packet will be re-directed to the first scheduler 102 as depicted in FIG. 2 and will be scheduled at $\lambda 4$.

Hence the bandwidth grabbing mechanism has redirected the packet. The situation in FIG. 2 corresponds directly to the situation in the void filling scheduler and, for that reason, existing voids, V1, V2, V3 and V4, are also indicated.

Figure 3:
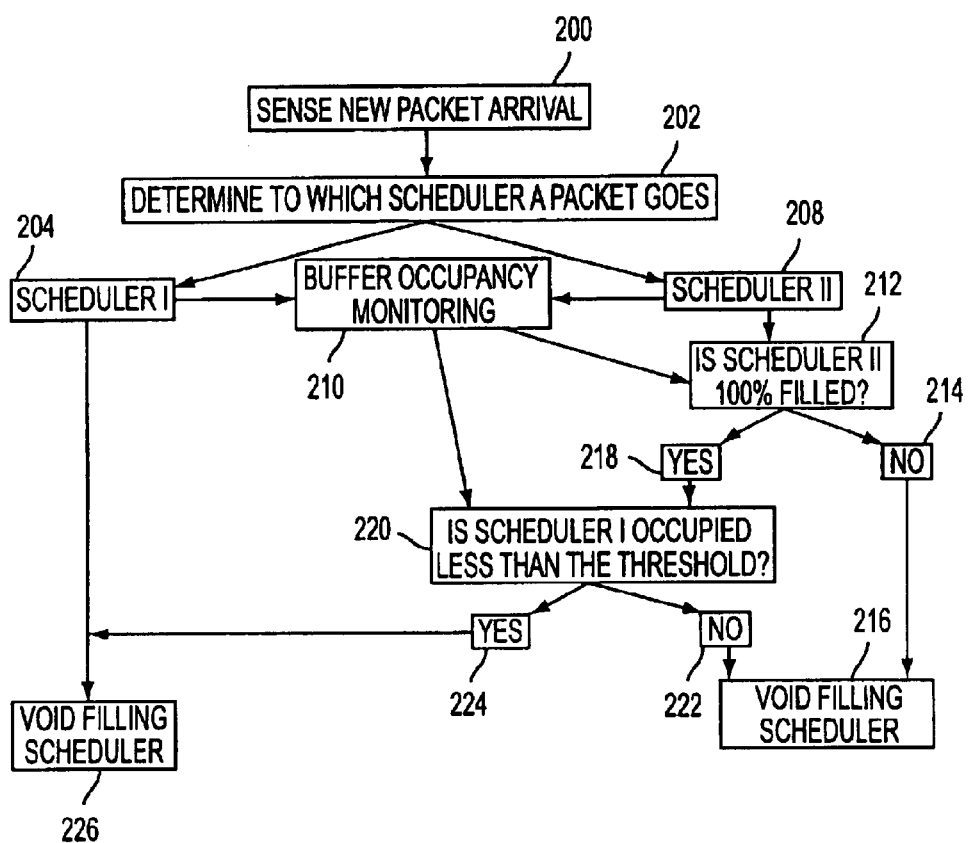
FIG. 3 is a flow chart of one embodiment of the present invention.

A flow chart of the present invention is depicted in FIG. 3. Upon arrival, the packet divider 106 senses a new packet arrival 200 and determines to which scheduler the new packet will go 202, i.e., assigns the new packet to a scheduler. This can be done either on the basis of some statistics (such that 50% of the traffic goes to each scheduler) or on basis of class differentiation. (This is done in differentiated service environments). After making the decision, the packet is directed toward the appropriate scheduler.

If the packet is assigned or directed to scheduler I 204, everything is done in a conventional way. If the packet is assigned to scheduler II 208, buffer occupancy monitoring 210 (or buffer monitoring circuitry 108) first determines whether the buffer in scheduler II is fully occupied 212. If scheduler II is not fully occupied 214, the packet is scheduled in a conventional way using the void filling scheduler 216. If scheduler II is fully occupied 218, then buffer monitoring circuitry determines whether the scheduler I is below a threshold 220. If scheduler I is not below a threshold 222, i.e., it is fully occupied, the packet stays in scheduler II. If scheduler I is below a threshold 224, bandwidth grabbing (or dynamic bandwidth allocation) is initiated. The packet is being re-directed to scheduler I and the void filling algorithm of scheduler I 226 controls routing of the packet.

As a result of using asymmetric bandwidth allocation, scheduler I operates over many more wavelengths. Therefore, it will experience very low traffic load. Furthermore, the amount of created voids and excess load will be extremely low.

Bandwidth grabbing redirects some of the packets from scheduler II to scheduler I, in essence increasing the traffic load experienced by scheduler I and also the number of voids. However, because creation of voids and excess load is a strongly non-linear process, the overall excess load, as seen by both schedulers, will be reduced. Hence, the probability of packet loss using two schedulers (or a plurality of schedulers) will be lower than the probability of packet loss when using only one scheduler. Hence, by using asymmetric bandwidth allocation in connection with bandwidth grabbing (or dynamic bandwidth allocation) it is possible to increase the efficiency of the void filling method to fight the occurrence of the excess load. Therefore, the proposed apparatus and method reduces the overall excess load and increases efficiency without escalating complexity.

Figure 4:
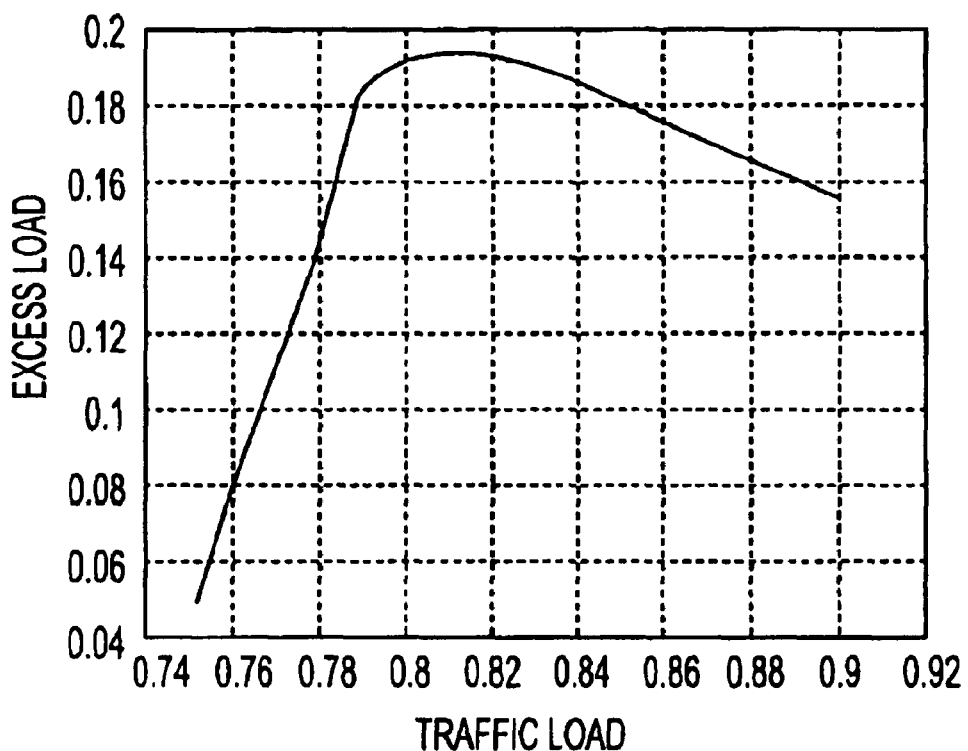
FIG. 4 is a plot of generated excess load as a function of input traffic load.

To evaluate the dependence of the excess load on the input traffic load, a test was run for the case of asynchronous, fixed length bursty traffic with a burstiness of 4. The packet size was set at 400 bytes, the selected basic delay line in the buffer was set at 2000 bytes and buffer depth was set at 6. It was assumed that the system contained a 4×4 nonblocking switch and 16 wavelengths per fiber. The generated excess load as a function of the input traffic load is plotted in FIG. 4. Note that for high input loads the excess load measures as high as 0.2 but for traffic loads below 0.75 it drops to increasingly small values. This is an indication that reducing the traffic load artificially will improve the efficiency of the void filling scheduler. Note the non-linear dependence.

To test the probability of packet loss for a system with more than one scheduler, the following simulation was run. The number of wavelengths per input fiber was fixed at 32 and traffic was divided 50/50 between two schedulers. The input traffic load was fixed at 0.8. The occupancy of the buffers of both schedulers was then monitored. When scheduler II was fully occupied (in a preferred embodiment, it was 100% occupied) and scheduler I's occupancy was below a threshold, bandwidth grabbing was initiated. The probability of packet loss as a function of the bandwidth threshold for packets going through both schedulers is plotted in FIG. 5. Numbers in circles are used to indicate bandwidth or wavelength allocation. Dashed lines represent the probability of packet loss for scheduler II and full lines represent the probability of packet loss for scheduler I.

Figure 5:
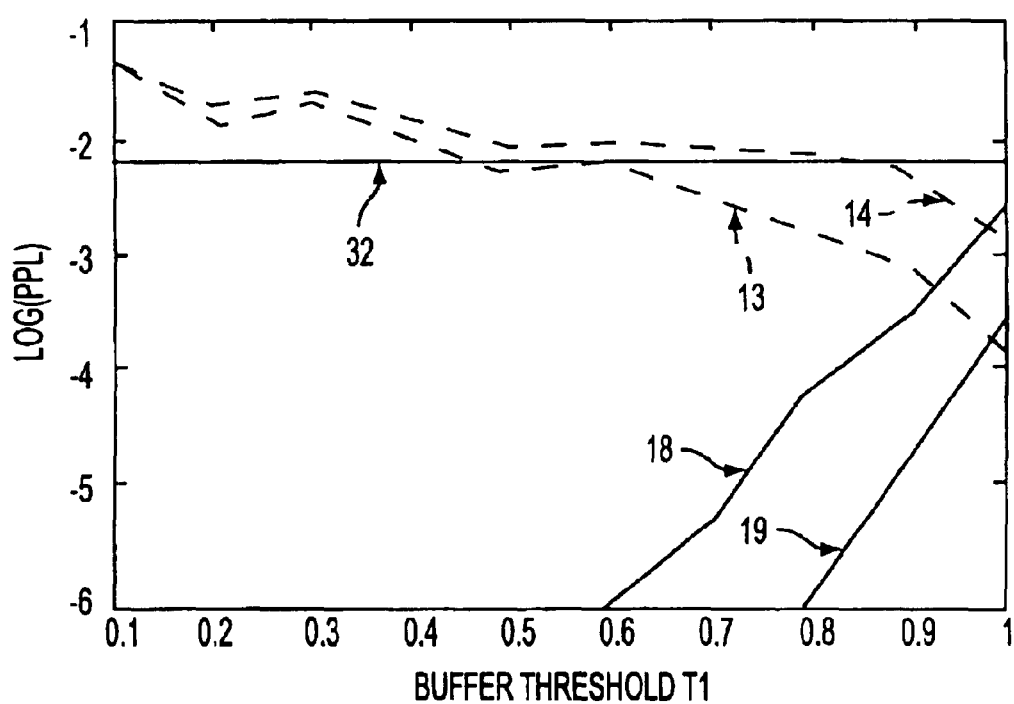
FIG. 5 is a plot of the probability of packet loss as a function of bandwidth threshold for packets going through both schedulers.

As shown in FIG. 5, a threshold T1 of 0.1 means that bandwidth grabbing almost never occurs and a buffer threshold T1 of 1 means that bandwidth grabbing almost always occurs. For thresholds very close to 0.9, both schedulers experience almost the same performance. The stronger the asymmetry of wavelength allocation, the better the overall performance. This is demonstrated by the fact that the 13/19 partition features better performance than the14/18 partition.

However, both partitions feature much better performance than the case when there is only one scheduler operating over all 32 wavelengths as indicated by straight line 32. Here, in the case of void filling scheduler, the non-linearity of the excess load process assures that the overall performance will be better when dividing the traffic in an asymmetric way between several schedulers operating in parallel.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A method of scheduling packets, comprising: dividing a bandwidth into available wavelengths: and assigning said available wavelengths to a plurality of schedulers, wherein said assignment of wavelengths is done in an asymmetric manner, and whereby at least one of said plurality of schedulers is assigned a different number of wavelengths than another of said plurality of schedulers.

2. The method according to claim 1, further comprising the step of assigning packets between said plurality of schedulers in a same percentage as the wavelengths that were assigned.

3. The method according to claim 1, further comprising the step of assigning packets between said plurality of schedulers in a different percentage as the wavelengths that were assigned.

4. The method according to claim 1, further comprising the step of dynamically allocating bandwidth between said plurality of schedulers.

5. The method according to claim 4, wherein said step of dynamically allocating bandwidth comprises:

monitoring buffer occupancy of at least one of said plurality of schedulers; and redirecting at least one packet to at least one of said plurality of schedulers having said buffer occupancy below a threshold.

6. The method according to claim 5, wherein said threshold falls within a range of 0.1 to 1 of said buffer's maximum occupancy.

7. The method according to claim 5, wherein said step of monitoring further comprises monitoring the occupancy of at least one virtual wavelength field.

8. The method according to claim 4, said step of dynamically allocating bandwidth comprises:

monitoring buffer occupancy of at least one of said plurality of schedulers;

determining if a buffer of said at least one of said plurality of schedulers is fully occupied; and redirecting at least one packet to at least one other of said plurality of schedulers having a buffer occupancy below a threshold.

9. The method according to claim 8, wherein said threshold is equal to or greater than 0.5 of said buffer's maximum holding time.

10. The method according to claim 4, wherein said step of dynamically allocating bandwidth comprises:

monitoring buffer occupancy of at least one of said plurality of schedulers;

determining if a buffer of said at least one of said plurality of schedulers is fully occupied; and redirecting at least one packet to at least one other of said plurality of schedulers having a minimum buffer occupancy.

11. The method according to claim 1, further comprising:

assigning said available wavelengths to said plurality of schedulers in an asymmetric manner, whereby at least one of said plurality of schedulers is assigned a different number of wavelengths than another of said plurality of schedulers;

assigning packets between said plurality of schedulers; and dynamically allocating bandwidth between said plurality of schedulers comprising the steps of:

monitoring buffer occupancy of at least one of said plurality of schedulers, determining if a buffer of said at least one of said plurality of schedulers is fully occupied; and redirecting at least one packet to at least one other of said plurality of schedulers having a buffer occupancy below a threshold.

12. A method of scheduling packets, comprising,

Receiving packets;

Statistically dividing said packets into more than one class; and

Directing said packets toward more than one class;

dynamically allocating bandwidth between said plurality of schedulers, wherein step of dynamically allocating bandwidth comprises;

monitoring buffer occupancy of at least one of said more than one scheduler; and redirecting at least one Packet to a scheduler having at least one buffer with an occupancy below a threshold.

13. A method of scheduling packets, comprising:

receiving packets;

dividing said packets into more than one class; and directing said packets toward more than one scheduler, wherein said step of dividing said Packets done on the basis of class differentiation;

dynamically allocating bandwidth between said plurality of schedulers, wherein step of dynamically allocating bandwidth comprises;

monitoring buffer occupancy of at least one of said more than one scheduler; and redirecting at least one packet to a scheduler having at least one buffer with an occupancy below a threshold.

14. The method according to claim 13, wherein said threshold is equal to or greater than 0.5 of said buffer's maximum holding time.

15. A method of bandwidth grabbing between a plurality of schedulers, comprising the steps of:

monitoring buffer occupancy of at least one of said plurality of schedulers;

determining if a buffer of said at least one of said plurality of schedulers is fully occupied; and a redirecting at least one packet to a scheduler having a buffer occupancy below a threshold.

16. The method according to claim 15, wherein said threshold is equal to or greater than 0.5 of said buffer's maximum holding time.

17. A method of bandwidth grabbing between a plurality of schedulers, comprising the steps of:

monitoring buffer occupancy of at least one of said plurality of schedulers, wherein said step of monitoring further comprises monitoring the occupancy of at least one virtual wavelength field: and redirecting at least one packet to a scheduler having a buffer occupancy below a threshold.

* * * * *